United States Patent [19]

Kelleher et al.

[11] Patent Number: 4,494,052
[45] Date of Patent: Jan. 15, 1985

[54] DC MOTOR SERVO SYSTEM

[75] Inventors: Kevin C. Kelleher, Palm Harbor, Fla.; Ned J. Kiser; Todd J. Christopher, both of Indianapolis, Ind.

[73] Assignee: RCA Corporation, New York, N.Y.

[21] Appl. No.: 405,441

[22] Filed: Aug. 5, 1982

[51] Int. Cl.³ .............................................. H02P 5/06
[52] U.S. Cl. ..................................... 318/254; 318/138
[58] Field of Search ................... 318/254 A, 254, 138, 318/393, 261, 611, 289

[56] References Cited

U.S. PATENT DOCUMENTS

| | | | |
|---|---|---|---|
| 3,831,073 | 8/1974 | Tanikoshi | 318/254 |
| 3,946,292 | 3/1976 | Tanikoshi | 318/289 X |
| 4,127,799 | 11/1978 | Nakamura | 318/254 A X |
| 4,135,120 | 1/1979 | Hoshimi | 318/254 A X |
| 4,197,489 | 4/1980 | Dunn et al. | 318/138 |
| 4,282,464 | 8/1981 | Uzuka | 318/254 X |
| 4,307,324 | 12/1981 | Regnier | 318/314 |
| 4,310,787 | 1/1982 | Seeger et al. | 318/85 |
| 4,313,074 | 1/1982 | Nomura et al. | 318/608 |
| 4,315,198 | 2/1982 | Lin et al. | 318/594 |
| 4,315,199 | 2/1982 | Kyomasu et al. | 318/601 |
| 4,315,200 | 2/1982 | Yamada et al. | 318/603 |
| 4,386,298 | 5/1983 | Toshimitu | 318/138 X |

Primary Examiner—Stanley J. Witkowski
Assistant Examiner—Patrick Keane
Attorney, Agent, or Firm—E. M. Whitacre; P. J. Rasmussen; E. P. Herrmann

[57] ABSTRACT

A system for controlling the speed of a brushless DC motor includes a microprocessor for generating stator control drive signals responsive to Hall sensors detecting relative rotor-pole-stator positions. Hall sensor signal transistions are compared against a reference frequency to provide an error signal which is processed by the microprocessor in accordance with a transfer function to emulate a type II servo loop. Stator commutation control signals are reduced in duration proportional to the resulting processed error signal. The control signals are thereafter applied to integrating current drives energizing the stator coils with triangular current signals.

12 Claims, 7 Drawing Figures

DC MOTOR SERVO SYSTEM

BACKGROUND OF THE INVENTION

This invention relates to servo systems and in particular to a digitally controlled servo loop for maintaining constant speed in a brushless DC motor, and for stopping the rotor at a particular angular orientation.

DC motors are manufactured which have a rotor element including permanent magnets having a plurality of successively spaced north and south poles. The permanent magnet is disposed proximate a fixed stator element having a plurality of windings or coils for producing magnetic fields when current is conducted therein. By selectively energizing the coils, they generate magnetic fields which impart forces on the magnetic fields emanating from the poles of the rotor magnet to produce rotation of the rotor. Commonly, Hall effect sensors are located in fixed relation to the coils and disposed proximate the rotor magnet to sense the relative position of the poles on the rotor magnet. Signals from the Hall sensors are employed to phase the energization of the coils to produce efficient operation of the motor.

It is known to control the speed of such motors by comparing the rate of rotation thereof to a known frequency such as from a stable oscillator and adaptively adjusting the motor drive parameters to eliminate the frequency error therebetween. Typically the output of such control or servo systems are applied to adjust either the bias potential of the commutating Hall sensors or the supply potential to the coil driver.

SUMMARY OF THE INVENTION

The present invention is a simplified servo system including a microprocessor to perform phase comparison and servo loop filtering, Hall effect sensors to provide commutation signals and rotor rotation, and coil drivers. Speed control is effected by controlling the duration of the stator coil drive pulses. The initiation of the stator coil drive pulses is delayed from the normal commutation point (i.e., the Hall sensor transition) proportional to the speed error signal and the termination of the drive pulses is determined by the Hall sensor transitions. The error signal is processed digitally in the microprocessor, via software, to produce a type II servo function so that there are no accumulated errors.

During spin up (motor starting) commutation of the drive signals to the stator coils is controlled substantially by the Hall sensor signals so that maximum torque is imparted to the rotor. Spin up speed is monitored to anticipate when the desired speed will be attained. The rate of change of rotor velocity is calculated for each cycle of the Hall sensor signal to predict at which particular cycle the rotor will attain lock speed. The coils are energized to produce maximum torque until the particular cycle that lock speed is achieved at which point the system enters the servo mode wherein the duration of the drive pulses are reduced to maintain constant rotor velocity and phase lock with a constant frequency reference signal. Since the rotor acceleration (i.e. drive torque) is changed substantially instantaneously, phase lock is performed in a minimum of time effectively reducing the spin up period.

DETAILED DESCRIPTION OF THE INVENTION

The invention will be described in the environment of a disc record player for reproducing signals from, for example, video disc records. The DC motor to be controlled is of the brushless type and is employed to rotate the player turntable. The motor stator coils are in fixed relation to the base of the player. The motor rotor includes a permanent magnet having a plurality of successive alternating north and south poles radially disposed about a concentric shaft and in fixed relation thereto. Two Hall sensors are mounted in fixed relation to the base and located proximate the rotor for sensing the relative position of the rotor poles with respect to the stator coils.

Figure 1:
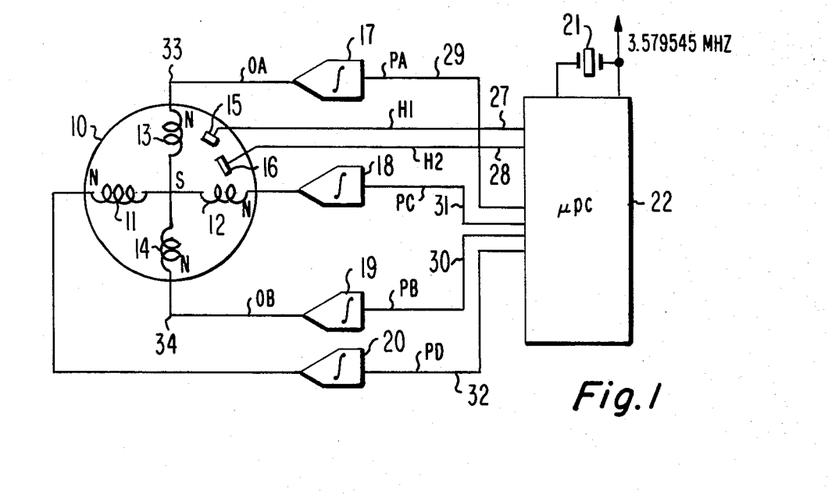
FIG. 1 is a partial block, partial schematic diagram of a brushless DC motor and drive circuitry therefor embodying the present invention.

Referring to FIG. 1 the stator 10 of a brushless DC motor has first and second serially connected stator coils 13 and 14 which are spatially disposed 180 degrees relative to the axis of rotor rotation. Third and fourth serially connected stator coils 11 and 12 are respectively spatially disposed 90 degrees from coils 13 and 14 with respect to the rotor axis. Stator coils 13 and 14 are positioned to be in like relationship, physically, to like rotor poles on opposite sides of the rotor axis. Similarly the windings of the coils are arranged to produce like electromagnetic fields with respect to the rotor poles on opposite sides of the axis for a given energizing current. Similarly stator coils 11 and 12 are disposed to be in like relationship to like rotor poles on opposite sides of the rotor axis.

A first current driver 17 responsive to control signals PA on connection 29 is connected to the serially connected coils 13 and 14 at connection 33 for providing coil current of a first polarity thereto. A second current driver 19 responsive to control signals PB on connection 30 provides coil current via connection 34 of opposite polarity to the serially connected coils 13 and 14. Similarly current drivers 18 and 20 responsive to control signals PC and PD on connections 31 and 32 Provide oppositely directed currents through serially connected stator coils 11 and 12. Current drivers 17, 18, 19 and 20 are phased with respect to one another for generating electromagnetic fields in the stator coils which interact with the magnetic fields produced by the rotor magnet to impart rotation to the rotor as is known in the art of brushless DC motors.

In a preferred embodiment current drivers 17 and 19 are subsumed in a single bridge type driver which will be described hereinafter with rspect to FIG. 3. Similarly current drivers 18 and 20 are subsumed in a second bridge type current driver.

The control signals PA, PB, PC and PD are rectangular pulses. The current drivers 17-20 integrate the control pulses. For relatively long control pulses, e.g., 90 electrical degrees, the integrating drivers rapidly saturate and output substantially rectangular drive pulses to the coils. On the other hand, for short control pulses the drivers output triangular drive signals, the amplitude of which is proportional to the control pulse width.

Referring again to FIG. 1, two Hall sensors 15 and 16 are arranged in fixed relation to the stator to provide control signals for commutating the drive pulses to the coils to provide clockwise rotation of the rotor. The Halls sensors are angularly positioned to provide signals which are electrically in e.g., 90 degree phase relationship. In the present discussion it will be presumed that the Hall sensors include circuitry enabling them to provide square wave signals having logic level amplitudes.

Signals H1 and H2 from the Hall sensors 15 and 16 are applied to a microprocessor 22. Responsive to the signals H1 and H2 the microprocessor 22 generates four phase signals PA, PB, PC and PD for energizing the coil drivers. The cycle time of the microprocessor is sufficiently fast that there is no substantial delay between the transition of the Hall sensor and the transitions of the control signals PA-PD except when delay is intentionally included. In the video disc player application, the microprocessor is clocked at a 3.579545 MHz frequency available from the video signal processing circuitry within the player.

Figure 2:
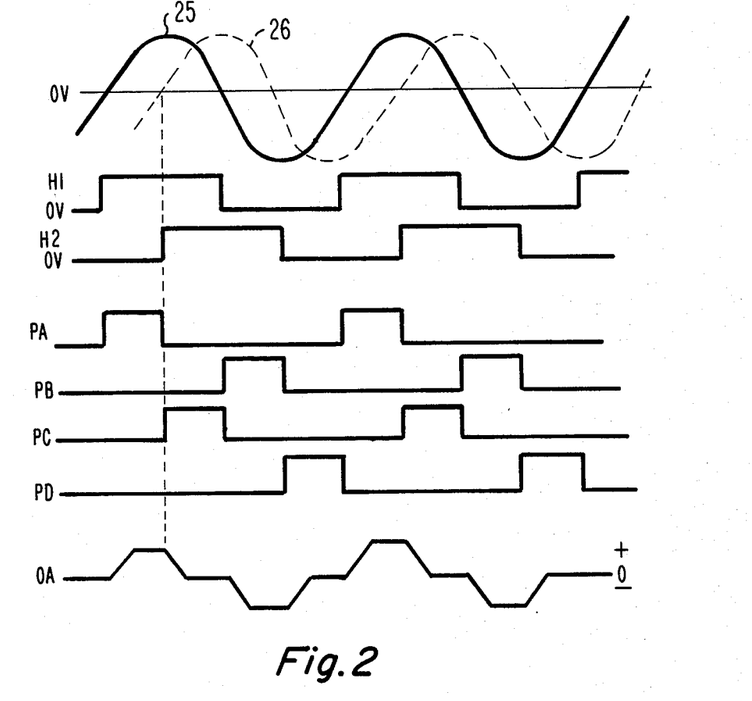
FIG. 2 is a timing diagram showing driving waveforms at various points of FIG. 1 system when the drive pulses are effectively commutated by the Hall sensors.

FIG. 2 shows the time relationships of the Hall sensor signals, the control pulses PA-PD and the current drive signal in coils 13 and 14 when the system is operating in the spin-up or start mode. During spin-up the stator coils are energized to produce maximum torque which entails driving the stator coils 13 and 14 for 90 degrees (electrical) with a first polarity current, then driving stator coils 11 and 12 for 90 degrees with the first polarity current. Coils 13 and 14 are then driven for 90 degrees with opposite polarity current after which coils 11 and 12 are driven for 90 degrees with opposite polarity current.

In FIG. 2 the substantially sinusoidal waveform 25 is the signal generated by Hall sensor 15 per se. Similarly Hall sensor 16 generates a substantially sinusoidal potential 26 which is delayed 90 degrees with respect to the Hall sensor 1 signal. The signals 25 and 26 are sensed for zero crossings to provide respective square wave logic signals H1 and H2 which are available on connections 27 and 28. Signals H1 and H2 are repeatedly examined by the microprocessor, which responsive to transitions thereof, generates the signals PA-PD. For each of the H1 signal periods the PA-PD control signals have quarter cycle periods defined by the transitions of the H1 and H2 signals. Each quarter cycle period corresponds to 90 electrical degrees. Responsive to the PA-PD control signals the current drivers output substantially quarter cycle current pulses coincident with the respective control pulse. The drive current waveforms OA (OB) are shown wherein the leading and trailing edges of the current pulses are ramped due to the integrating characteristic of the drivers 17 and 19.

It will be readily appreciated that as the rotor increases angular speed the period of the signals H1 and H2 decreases and the periods of the control pulses PA-PD are concomitantly reduced.

Figure 3:
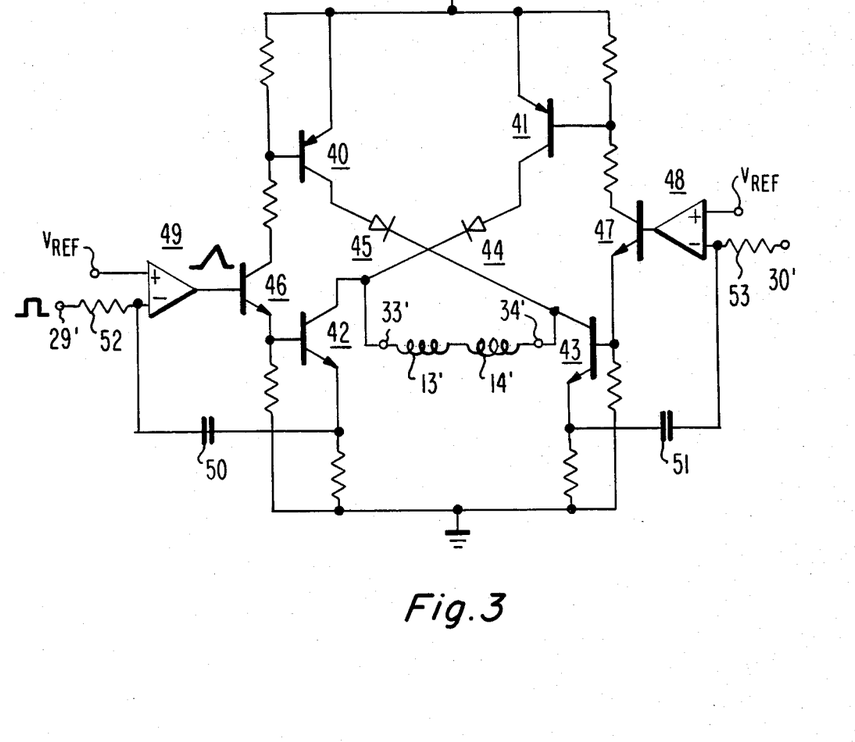
FIG. 3 is a circuit schematic of a stator coil current driver.

FIG. 3 illustrates a bridge type current driver for driving a pair of stator coils 13' and 14'. In the circuit pnp transistor 40 having emitter and collector electrodes respectively connected to positive supply potential and connection 34' and npn transistor 42 having collector and emitter electrodes respectively connected between connection 33' and relatively negative supply potential are simultaneously conditioned into conduction by phase splitting amplifier transistor 46. The amplitude of current conducted by transistor 42 is proportional to the potential applied to the base electrode of transistor 46. When transistors 40 and 42 are conditioned to conduct (by transistor 46) current flows from right to left (in the Figure) in the stator coils 13' and 14'. Similarly pnp transistors 41 connected between positive supply and connections 33' and npn transistor 43 connected between connection 34' and negative supply are conditioned for simultaneous conduction by phase splitting transistor amplifier 47. Diodes 45 and 44 are serially connected in the collector circuits of transistors 40 and 41 to isolate the pnp transistor which is currently not conducting from potential spikes which may be created by the coil inductance.

Phase splitting transistor amplifiers 46 and 47 are conditioned to conduct by differential amplifiers 49 and 48 respectively. Differential amplifier 49 is responsive to a control signal PB' applied to its inverting input via connection 29', where PB' is complementary to the control signal PB illustrated in FIG. 2. Differential amplifier 48 is responsive to a control signal PA' applied to its inverting input terminal via connection 30', where control signal PA' is complementary to control signal PA. Thus transistors (40, 42) and transistors (41, 43) conduct to the exclusion of each other.

It will be noted that amplifier 49 (48) transistors 46 and 42 (47 and 43) comprise a composite amplifer with capacitive degenerative feedback 50 (51). This arrangement is in the form of a classic integrator circuit to provide the integration characteristics mentioned previously.

Figure 4:
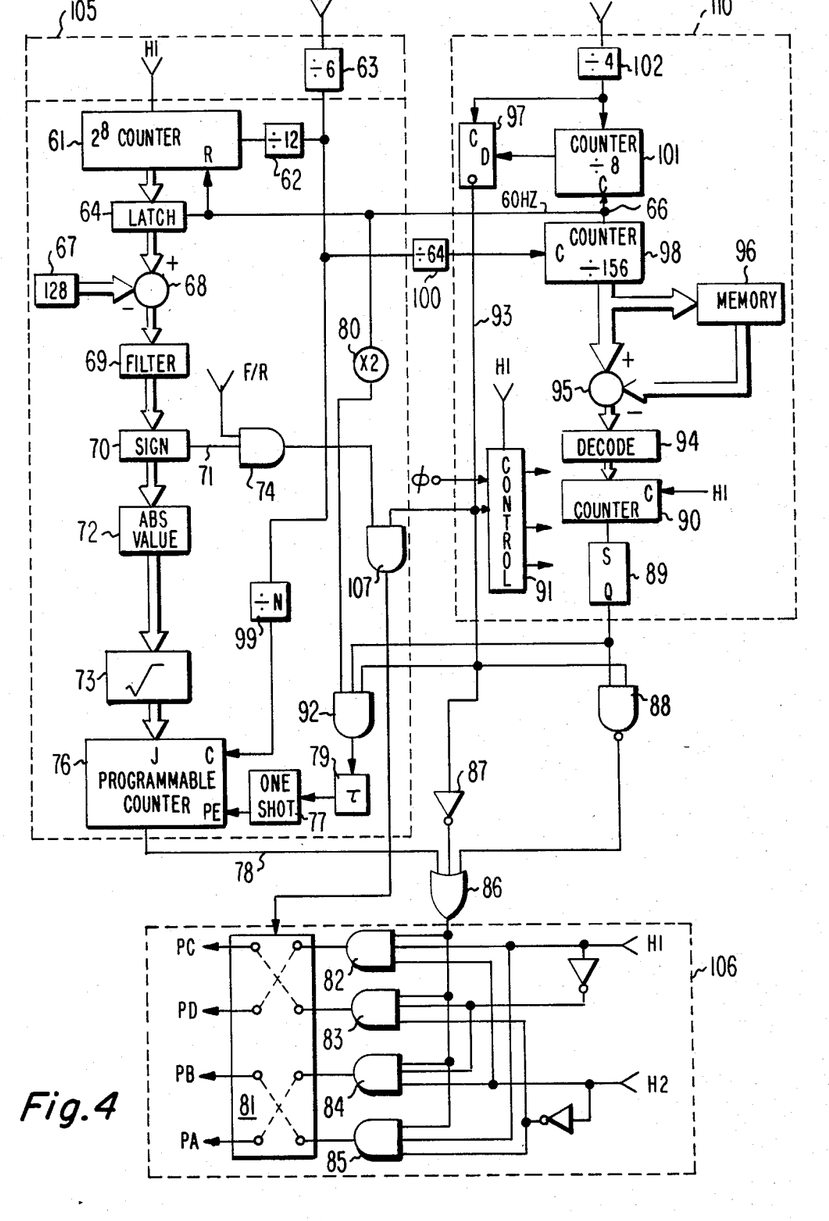
FIG. 4 is a block diagram of circuitry for realizing the functions provided by the FIG. 1 microprocessor.

FIG. 4 is a block diagram of a hardware realization of the present invention, the description of the operation of which will serve to generally explain the functional operation of the microprocessor 22 of FIG. 1. Control of the DC motor is performed in three modes; spin up, speed locked, and spin down. The spin up mode was generally described previously. With reference to FIG. 2 the four control signals PA-PD are representative of the four logic states of the two Hall sensor signals H1 and H2. It will readily be appreciated that it is a trivial exercise to program the microprocessor 22 to generate the control signals responsive to input signals H1 and H2. In FIG. 4 the four control signals PA-PD are generated by the circuitry circumscribed by the broken line 106 including the four three-input AND gates 82-85. One input to each of the AND gates 82-85 is energized from OR gate 86, the output of which is a logic "high" during spin-up. The second and third inputs of the AND gates receive the requisite combinations of the Hall signals H1 and H2 and their complements H1 and H2 to selectively produce the states of the control signals illustrated in FIG. 2 in the conventional manner. The output signals from AND gates 82 and 83 and AND gates 84 and 85 are applied to cross point switches 81 which effectively controls the direction of current applied to the stator coils. The state of the cross point switches is controlled by the output state of AND gate 107 which state is held at a logic "low" during spin-up so that the relative phase of the control signals PA-PP remains constant.

During spin-up, the system successively checks the output signal from Hall sensor 15 to determine if the rotor is approaching lock speed. In the video disc player lock speed is substantially 450 RPM or 7.5 Hz. The rotor magnet is designed with four sets of North and South poles. Thus for every four cycles of the Hall sensor control signal H1, at lock speed, there are 8 cycles of 60 Hz signal. For rotor speeds less/more than the lock speeds there are more/less than 8 cycles of 60 Hz signal. The system successively counts the number of cycles of 60 Hz signal per four periods of Hall sensor signal. When 8 cycles of 60 Hz pulses per revolution are detected the difference from there being exactly 8 cycles of 60 Hz signal during the last revolution is measured. The difference value is utilized to reduce the pulse duration of the control signals PA-PD to tend to prevent the rotor rotation rate from overshooting the lock rate. In this way the system anticipates when lock speed will occur and reduces rotor acceleration for the Hall sensor cycle at which the rotor will attain lock speed.

In FIG. 4 the circuitry circumscribed in Box 110 monitors spin up speed. In the circuit, dividers 63 and 100 and counter 98 divide down the 3.58 MHz system clock to produce pulses occurring at substantially 60 Hz. (In the FIG. 1, microprocessor system interrupts are generated at 60 Hz). The 60 Hz pulses, present on connection 66 clock the counter 101. Counter 101 is arranged to output a pulse having a duration of a 60 Hz period for every eight clocking pulses. The output signal from counter 101 is applied to the input-terminal of the latch 97.

The Hall sensor signal H1 is divided in the divider circuit 102 to generate an output pulse for every four Hall sensor cycles, which is equivalent to one output pulse per rotor revolution. The output pulses from divider 102 are applied to reset the counter 101 and to latch the output of counter 101 into circuit 97. If eight clock pulses of the 60 Hz signal have occurred during one rotor revolution, output connection 93 of the latch 97 will be in a "high" state. If more or less than eight 60 Hz clock pulses occurred, the latch 97 output will be in a logically "low" state. During spin up the logical "low" output state on connection 93 is inverted by INVERTER 87 and applied to OR gate 86. In response thereto OR gate 87 outputs a logical "high" as previously assumed in the description of the operation of circuitry 106. On the other hand, when the output of the latch 97 is high, control of the circuitry 106 reverts to the remaining FIG. 4 circuitry.

The circuitry anticipates when the rotor will attain locked speed by successively determining how much greater the duration of one rotor rotation is than the duration of exactly eight cycles of the 60 Hz clock. Assume that the counter 98 is an 8 bit binary counter with combinatorial logic arranged to reset the count to zero on the 156th input pulse. In the FIG. 4 circuit, this reset pulse provides the system 60 Hz clock signal. Nominally when counter 101 counts the 60 Hz clock signals, the transition of the 60 Hz signals will not coincide with the reset output of counter 102 which corresponds to a transition of the Hall sensor signal H1/4.

Figure 5:
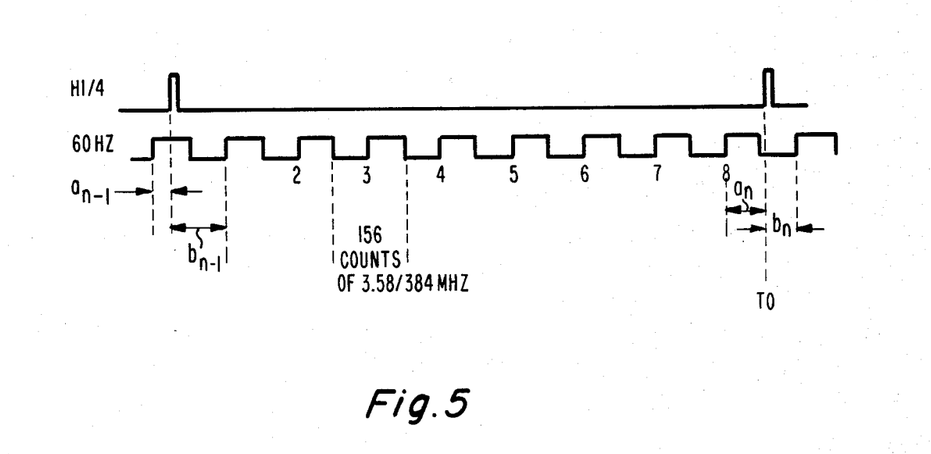
FIG. 5 is a timing diagram relating to the locked speed predicting function of the FIG. 4 circuitry.

Assume that the counter 101 triggers or counts responsive to the positive transition of the 60 Hz signal. The waveforms of FIG. 5 illustrate a typical relationship between the 60 Hz signal and the H1/4 signal as the rotor approaches locked speed. The numbers adjacent the positive transition of the 60 Hz signal indicate the point at which the counter 101 is incremented. It can be seen that there are seven complete cycles of 60 Hz signal plus the quantity $B_{n-1}+A_n$ between successive pulses of the H1/4 signal i.e. per one revolution of the rotor. Each cycle of the 60 Hz signal represents a count of 156 by counter 98. At time $t_0$ counter 98 well contain a count or binary number corresponding to $A_n$. The remaining count to complete a 60 Hz period is therefor $156-A_n$ or $B_n$. A little arithmetic will show that the value by which $B_{n-1}+A_n$ differs from 156 is equal to $|A_n-A_{n-1}|$. Thus by subtracting successive values of the number resident in counter 98 at the instance of the occurance of the H1/4 reset signals, the time at which the rotor will achieve locked speed can be predicted. For a given system, statistically it can be determined that once the number $A_n-A_{n-1}$ enters a particular range the rotor will attain locked speed during the next revolution and the value of the number $A_n-A_{n-1}$ is generally indicative of one of the four Hall sensor cycles during which lock will occur.

Referring again to FIG. 4, the count resident in counter 98 is accessed and stored in memory 96. The count $A_n$ is also applied to adder 95 where it is differentially added to the previous count $A_{n-1}$ available from memory element 96 to produce the difference $A_n-A_{n-1}$. This number is applied to decoder 94. When the value of $A_n-A_{n-1}$ is within the requisite range indicative of the approach of locked speed during the next rotor revolution the decoder produces an output to program the Counter 90. Counter 90 counts cycles of the Hall Sensor signal H1 and generates an output for the H1 cycle at which locked speed is anticipated and sets the flip-flop 89 which places the system in the locked-speed mode. (The memory 96, adder 95, decoder 94, and counter 90 are all synchronized by the controller 91 which is responsive to the signal H1 and the reference frequency).

Note that during the time that latch 97 goes high and the system achieves the locked speed mode, NAND gate 88 having first and second input terminals connected to the output terminals of latches 97 and 89, and having an output terminal connected to a further input terminal of OR gate 86, maintains the output potential of OR gate 86 high until the locked-speed mode is activated.

The circuitry circumscribed by block 105 performs the locked speed-servo function. Operation of this circuitry will be described with reference to FIG. 6. The circuit elements are labeled in a manner generally representative of a flow chart representative of the opeation of the microprocessor in FIG. 1 in the locked-speed mode.

Figure 6:
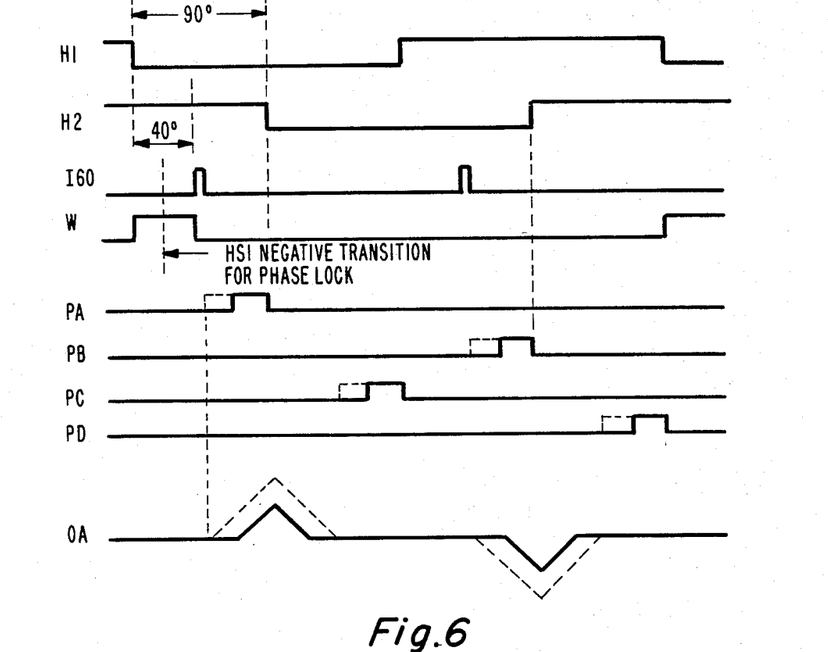
FIG. 6 is a timing diagram of driving waveforms provided by the FIG. 1 and FIG. 4 circuits when the system is operating phase locked to a stable reference frequency.

In the locked-speed mode the phase relationship of the Hall sensor signal H1 is determined with respect to the leading edge of the 60 Hz reference signal pulses four times per revolution, i.e., during each cycle of the Hall sensor signal. This is done by starting a counter (61), which counts divided 3.58 MHz signals, at the negative transition of the H1 signal and halting the counter at the leading edge of the 60 Hz pulse. The number in the counter is indicative of the phase error. Referring to FIG. 6 the waveform W indicates the count period. The width of the positive going pulse W is the phase detection period and has a maximum width of 256 cycles of a 49 KHz clock (e.g., 3.58/72 MHz). The count of 256 represents a phase error of 40 degrees (electrical). When the H1 signal is phase locked with the reference frequency, the number in the counter is 127. Thus to determine if the H1 signal is advanced or retarded from the locked condition the number 127 stored in memory (67) is subtracted (68) from the number in the counter. A positive difference indicates that the H1 phase is advanced relative to the desired phase relationship and a negative difference indicates that it is delayed. As in an analog servo system the error signal is filtered to insure closed loop system stability. In the present apparatus, however, the filtering is done digitally (69) and will be described further hereinafter with reference to FIG. 7.

The system performs 2's complement arithmetic and therefore equal positive and negative differences will be represented by different binary numbers. Since the sign of the error has been determined it is advantageous to determine the absolute value (72) of the number to facilitate further processing. Advancing or retarding rotor phase is accomplished by determining the duration of the drive currents applied to the stator coils, which phasing is performed under the control of the "sign" bit of the filtered difference signal. Thus equal increments or decrements in rotor speed will be effected by equal drive signals. The two's complement negative differences are therefore converted to positive numbers to be further processed in the same channel as positive differences.

For smooth operation of the DC motor in the locked-speed mode it is advantageous to drive the stator coils with triangular drive signals rather than rectangular pulses. Drive control is performed by controlling the width of the control pulses PA-PD which are subsequently integrated by the coil drivers. Because the integration function affects the amplitude of the driver signals, the driving energy applied to the stator coil is proportional to the square of the change in control signal pulse width. In order to account for the squaring factor, the square root function (73) is performed on the error signal.

The square root of the error signal is then employed to control the width of the control pulses PA-PD. This is performed by delaying the leading edge of the respective control pulses generated by the circuit 106. In FIG. 4 the square root of the error signal is directed to the programming input terminals (J) of a programmable counter (76). The counter produces an output after the programmed number of clock cycles have been counted. The counter output signal is applied via OR gate 86 to enable the control pulse generating ANDS gates 82–85. The counter outputs a signal four times per H1 cycle, each output signal being delayed from the leading edge transition of a 120 Hz (60 Hz×2) signal by an amount proportional to the error signal. The larger the difference signal to which the counter is programmed the shorter the delay period generated in the counter and the wider are the control pulses PA-PD. The phantom lines in the PA-PD waveforms shown in FIG. 6 indicate the region of variability in the control pulses, which region is located at their leading edges. It should also be noted that even for the unfiltered error signal being zero the system must provide drive pulses to overcome the frictional drag of the mechanical system. As a result the system may produce drive pulses when the motor speed is precisely correct. It follows that the drive pulses will tend to be phased to alternately advance and retard motor speed.

The clock rate counted by the delay counter (76) is determined by the resolution desired in the system. The higher the rate the more accurate the delay subject of course to the resolution of the programming error signal or line 75. In FIG. 4 the clock rate is 3.58 MHz divided by 6×N. Note also that the programming count is loaded into the counter (76) by the 60 Hz reference signal (actually 2×60 Hz) via one shot 77 connected to the "PE" input of counter 76. Since the 60 Hz signal initiates the process of calculating the phase error it is necessary to build in a delay (79) in the "PE" input signal to allow the error calculation to be completed. The calculations however occur sufficiently fast that the delay does not significantly affect the control pulse widths PA-PD or may be accounted for by including a constant in the error signal. Note further that the output of the counter 76 has no effect on the pulse generating circuitry 106 during spin up since the output of the OR gate 86 is constantly held high by virtue of the signal from latch 97.

Figure 7:
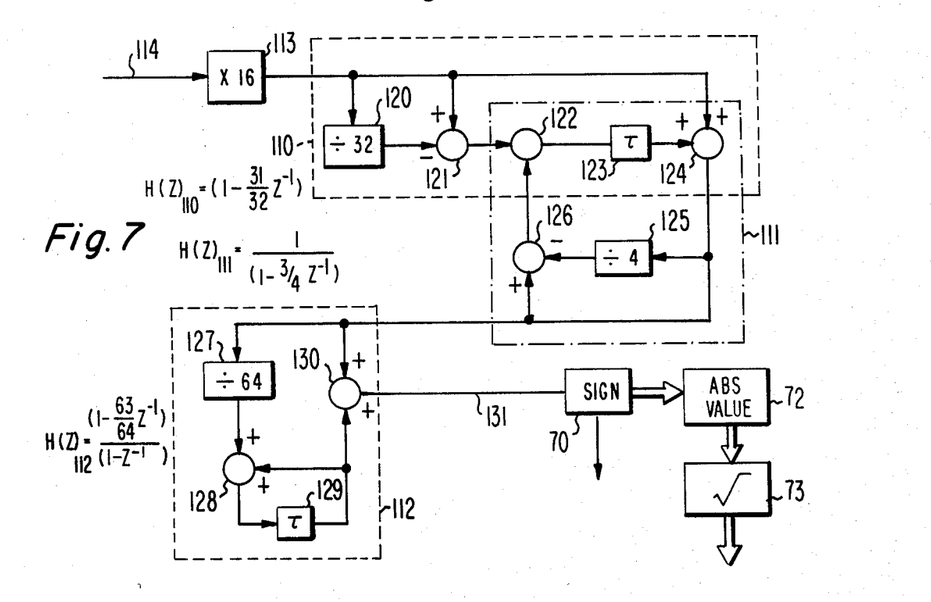
FIG. 7 is a block diagram of analogous circuitry for performing the servo filter function of the FIG. 1 microprocessor.

Referring next to FIG. 7 the operation of the servo filter (69) function will be described. The blocks in the figure represent either a conventional digital hardware element in a circuit realization of the function or a process implemented by software in a microprocessor based system. The arrows represent the direction and sequence of signal flow. The circles are digital adders and subtractors as indicated, and the blocks designated with the letter tau are delay elements which impart a one sample delay. The system elements are presumed to operate with two's complement logic.

In the video disc implementation the turntable motor (the motor being servoed) contributes two poles to the closed loop servo system. The first pole is effectively at a frequency of minus infinity and the second is at one half Hz. Unity gain crossover is to occur at approximately 4 Hz at which the system transfer function should be exhibiting a slope of no more than 20 dB per decade of frequency to guarantee system stability.

The system of FIG. 7 includes a gain multiplier 113, a differentiator 110, a rolloff filter 111 and an integrator 112. Signal is applied to the filter at connection 114 and is available from the filter to the "sign" circuit 70 at connection 131. The multiplier simply shifts the binary representation of the signal three places leftward and adds three zeros to the three least significant bit locations of the binary numbers. Whether the number is positive or negative (two's compelment arithmetic) will be indicated by the presence of a "zero" or a "one" in the most significant bit (MSB) position. It can be shown that the operation on the numbers applied at connection 114 by the filter process will not affect the MSB. Therefore to determine the sign (70) of the filtered number all that is required is to examine the MSB for a "one" or a "zero".

It can also be shown that the filter circuit including the elements 110, 111 and 112 produces a transfer function given by $$H(z) = \frac{(1 - 63/64\, Z^{-1})(1 - 31/32\, Z^{-1})}{(1 - Z^{-1})(1 - 3/4\, Z^{-1})} \quad (1)$$

in Z transform notation. Translated to the frequency domain the circuit contributes zeros at ½ Hz and 1 Hz and poles at zero and 8.7 Hz. Including the poles contributed by the motor the closed loop transfer function has a slope of 40 dB per decade from zero to one Hz. The pole at ½ Hz contributed by the motor is counteracted by the zero contributed by the filter. The system response breaks at 1 Hz due to the zero contributed thereat by the filter reducing the slope of the system response to 20 dB per decade. At the 8.7 Hz pole the response breaks again to a 40 dB per decade roll off.

To more specifically describe the filter function each sample x(n) of the error signal is divided (120) by 32 and subtracted (121) from itself to generate the term 31/32 x(n). This term is stored (123) for one sample period and subtracted (122, 124) from the next successive sample to produce the modified sample $$x(n) - 31/32\, x(n - 1) = y(n). \qquad (2)$$

The y(n) samples are divided by four (125) and subtracted (126) from y(n) to generate the term ¾ y(n) which is added back (124) to the term 31/32 x(n) resulting in $$y(n) = x(n) + 31/32\, x(n - 1) + 3/4\, y(n - 1) \qquad (3)$$

The samples y(n) are divided (127) by 64, discretely integrated (128, 129) and added back (130) on y(n). The integration is performed by successively adding (128) each sample y(n)/64 to the accumulated sum of samples each delayed 1 sample period, i.e., $$\sum_{i}^{N} y(n - 1)/64$$

where N is the number of samples preceding y(n). The filter output O(n) at connection 131 is $$O(n) = y(n) + \sum_{i} y(n - i)/64 \qquad (4)$$

Equations 2, 3 and 4 may be combined to resolve the output O(n) in terms of input samples x(n) but it is simpler and more meaningful to use the Z notation illustrated in equation 1.

Spin down or stopping the motor is accomplished by switching the system back to the Hall sensor commutate mode with the PA, PB and PC, PD phases reversed. With reference to FIG. 4 this is tantamount to simply switching the cross point switches 81. The rotor will fall out of synchronism with the reference frequency, latch 97 will go low and drive pulses will be produced in circuit 106 solely responsive to the Hall sensor signals H1 and H2. When the rotor comes to reset the system must be deenergized to preclude it from accelerating in the reverse direction In the microprocessor implementation the motor is stopped by a) reversing the phasing of PA-PB and PC-PD via software and generating the pulse waveforms responsive to detection of the transitions in the H1, H2 signals. The drive pulses PA-PD are each of substantially 90 degree duration insuring maximum deacceleration. The microprocessor determines when the rotor reverses rotation by monitoring the successive transitions of the waveforms H1 and H2. A positive transition of the H1 signal when H2 is high or a negative transition of the H2 signal when H1 is high indicates a phase reversal in the rotor magnet and thereby a motor rotation reversal. At this point all drive current to the stator coils can be ceased. However, the rotor may coast or drift for an undesirably long time before coming to rest. To preclude such coasting forward, and reverse stator drive is applied to actively stop the motor. In order that the system does not enter a continuous oscillatory mode, a particular routine is activated. When rotor rotation-reversal is detected the phases of the drive signals PA-PD are conditioned for forward drive and simultaneously a counter (not shown) is activated. The forward drive pulses are generated responsive to the H1, H2 transitions and poled to tend to stop the reverse rotation of the rotor. When the direction of rotation is again reversed (to the forward direction) the contents of the counter is proportional to the time required to produce a rotor reversal. The phases of the drive signals are again reversed to decelerate the forward rotation but the coil drive is applied for only ¾ of the time indicated in the counter. During the ¾ drive period the rotation reverses and thereafter the rotor enters a drift period. The phase of the drive signals are again switched with full drive applied until rotation again reverses and the required time is again counted. Reverse drive is again applied for ¾ of the latter indicated period. This routine is iterated until the rotor comes to rest. In summary the motor is slowed by applying reverse phased drive pulses until rotation reverses e.g. to a counter clockwise CCW rotation. The coils are then driven for clockwise CW rotation until rotor reversal. Coil phasing is again reversed for CCW rotation and the time monitored until rotor reversal. The coils are then phased for CW rotation and driven for an interval of ¾ of the last CCW drive interval. After the rotor reverses, the coils are driven CCW until rotor reversal and the time is again measured. The coils are then driven CW for ¾ of the last CCW drive, etc. until the rotor stops. It should be noted that approximately a ¾ drive period tending to induce forward rotation is sufficient to produce a rotation reversal because the Hall sensors are physically biased for efficiently commutating the stator drive signals for forward rotation. As a result when the drive phases are switched to induce reverse rotation the commutation of drive signals is less efficient, requiring a longer drive period than forward commutation to produce like results. The factor of ¾ is chosen arbitrarily but is large enough to insure that rotor reversal will occur.

Inclusion of the drift period by providing drive in one direction for only ¾ of the drive time required in the opposite direction to induce rotor rotation reversal provides relatively rapid stopping without the danger of entering an oscillatory mode. Normally the successive rotor reversals will occur in less than one quarter rotation of the rotor or within one period of the Hall sensor signals.

Note the circuit illustrated in FIG. 4 is included for describing the invention, and shows only the main elements. It will readily be appreciated that it is a straightforward exercise to program the microprocessor of FIG. 1 to perform the indicated function.

What is claimed is:

1. A system for controlling a brushless DC motor of the type having two or more stator coils which are successively energized to impart rotation to a rotor including a permanent magnet having a plurality of alternating North and South poles comprising:

first and second sensor elements mounted in fixed relation to the stator coils for providing first and second bilevel signals representing the relative position of the rotor magnet poles with respect to the stator coils, said bilevel signals having a predetermined phase relationship;

a reference signal having a frequency to which the rotation rate of said rotor is to be synchronized;

control signal generating means responsive to said first and second bilevel signals for generating pulsed control signals the phases of which are determined by the state of said first and second bilevel signals and the durations of which are substantially determined by successive transitions of said bilevel signals when the system is operating in a spin up mode, and being further responsive to said reference signal for synchronizing motor speed thereto in a locked speed mode, said control signal generating means generating an error signal related to the difference between rotor frequency and said reference signal frequency by performing successive time measurements between a prescribed transition of said first bilevel signal and a prescribed transition of said reference frequency, and processing said error signal in accordance with the function $$H(z) = \frac{(1 - AZ^{-1})(1 - BZ^{-1})}{(1 - CZ^{-1})(1 - DZ^{-1})}$$

where Z connotes the conventional Z transform and the factors A, B, C, and D are constants which are positive real or zero, the magnitude of the processed error signal determining the phase relationship of said control signals in the locked speed mode and determining the duration of said pulsed control signals by varying the leading edges thereof relative to the trailing edges of said control signals which are determined responsive to state transitions of said first and second bilevel signals in said locked speed mode; and driver circuits responsive to said pulsed control signals for energizing respective ones of said stator coils, said driver circuits designed to provide stator coil drive current of either polarity, the duration of which is proportional to the duration of said control signals.

2. A system for controlling a brushless DC motor of the type having two or more stator coils which are successively energized to impart rotation to a rotor including a permanent magnet having a plurality of alternating North and South poles comprising:

first and second sensor elements mounted in fixed relation to the stator coils for providing first and second bilevel signals representing the relative position of the rotor magnet poles with respect to the stator coils, said bilevel signals having a predetermined phase relationship;

a reference signal having a frequency to which the rotation rate of said rotor is to be synchronized;

control signal generating means responsive to said first and second bilevel signals for generating pulsed control signals the phases of which are determined by the state of said first and second bilevel signals and the durations of which are substantially determined by successive transitions of said bilevel signals when the system is operating in a spin up mode, and being further responsive to said reference signal for synchronizing motor speed thereto in a locked speed mode, said control signal generating means generating an error signal related to the square root of the difference between rotor frequency and said reference signal frequency by performing successive time measurements between a prescribed transition of said first bilevel signal and a prescribed transition of said reference frequency, the magnitude of the error signal determining the phase relationship of said control signals in the locked speed mode and determining the duration of said pulsed control signals by varying the leading edges thereof relative to the trailing edges of said control signals which are determined responsive to state transitions of said first and second bilevel signals in said locked speed mode; and driver circuits responsive to said pulsed control signals for energizing respective ones of said stator coils, said driver circuits including means to integrate said control pulses for providing drive signals having sloping transitions, the drive signals generally saturating to a fixed amplitude during the spin up mode, and said drive signals being generally triangular during the locked speed mode, said driver circuits designed to provide stator coil drive current of either polarity, the duration of which is proportional to the duration of said control signals.

3. The system set forth in claim 2 wherein said control signal generating means includes means to generate a modified error signal for determining the leading edges of said control signals by processing said error signal in accordance with the function $$H(z) = \frac{(1 - AZ^{-1})(1 - BZ^{-1})}{(1 - CZ^{-1})(1 - DZ^{-1})}$$

where H(z) is described in conventional Z transform notation and the factors A, B, C and D are constants which are positive real or zero.

4. The system set forth in claim 1 wherein said control signal generating means includes means for generating the square root of said error signal.

5. The system set forth in claim 1 or 2 wherein said control signal generating means generates control signals for stopping said motor, which control signals alternate in phase depending on the direction of rotor rotation, and wherein successive control signals tending to halt reverse rotor rotation are applied for a fraction of the last most time required for oppositely phased control signals to halt forward rotor rotation.

6. The system set forth in claim 5 wherein said fraction is ¾.

7. The system set forth in claim 1 or 2 wherein said control signal generating means includes means for generating a lock signal during said spin up mode when the motor speed is within a prescribed range of synchronization with said reference signal, and further comprising:

means for generating a further signal responsive to N occurrences of said first bilevel signal where N is the number of North or South poles on said permanent magnet;

means responsive to said reference signal and to said further signal for counting the number of cycles, M, of said frequency of said reference signal per N occurrences of said first bilevel signal; and means for comparing the number M with a predetermined number and producing said lock signal when M equals said predetermined number.

8. The system set forth in claim 1 or 2 wherein said control signal generating means comprises a microprocessor.

9. A system for controlling a brushless DC motor of the type having two or more stator coils which are successively energized to impart rotation to a rotor including a permanent magnet having a plurality of North and South poles comprising:
- first and second sensors providing first and second bilevel signals having substantially 90 degree phase relationships and corresponding to the pole positions of the rotor with respect to the stator coils;
- a stable reference frequency;
- coil driving circuits responsive to control pulses for energizing respective ones of said stator coils with drive currents proportional to the duration of said control pulses and poled in response to the relative phases of said control pulses;
- microprocessor means responsive to said first and second bilevel signals and said reference frequency for generating said control signals commensurate with synchronizing rotor rotation with said reference frequency, said microprocessor characterized in being fixedly programmed for
  (a) detecting the phase relationship between said reference frequency and rotor rotation rate by counting the number of cycles of a clock signal occurring between prescribed transitions of said first bilevel signal and said reference frequency;
  (b) subtracting a fixed constant from said number of cycles to produce an error signal;
  (c) processing said error signal according to the transfer function $$H(z) = \frac{(1 - AZ^{-1})(1 - BZ^{-1})}{(1 - CZ^{-1})(1 - DZ^{-1})}$$

where the factors A, B, C and D are constants which are positive real or zero;
  (d) taking the square root function of said processed error signal;
  (e) generating control pulses according to the logical combinations of the states of said first and second bilevel signals, and varying the width of said control pulses by delaying the leading edges of said control pulses in accordance with the square root of the processed error signal.

10. A method of controlling the speed of a brushless DC motor of the type having a permanent magnet with alternating north and south poles fixed to the rotor, and stator coils fixed to a base comprising:
- generating cyclically occurring reference pulses having a relatively stable repetition frequency;
- detecting the relative position of the rotor magnet poles relative to said stator coils and generating first and second bilevel signals having a generally 90 degree phase relationship;
- counting cycles of a further stable frequency occurring between a prescribed transition of said first bilevel signal and a prescribed transition of said reference pulses;
- subtracting a fixed constant from the number of cycles counted thereby producing an error signal and wherein a positive and negative error signals indicate that the rotor speed is too fast and slow respectively;
- determining the square root of the processed error signal;
- generating control pulses the termination of which are in fixed relation to transitions of said first and second bilevel signals, said control signals having a first phase relationship for said error signal being positive and a second phase relationship for said error signal being negative, said first and second phase relationships conforming to the control signal sequence requisite for energizing the stator coils to produce forward and reverse rotor rotation respectively;
- establishing the duration of each control signal by delaying its leading edge from prescribed transitions of said reference pulses, said delay being proportional to the square root of said error signal;
- integrating the control pulses for producing triangular current drive to respective ones of said stator coils.

11. The method set forth in claim 10 further characterized by:
processing the error signal according to the function $$H(z) = \frac{(1 - AZ^{-1})(1 - BZ^{-1})}{(1 - CZ^{-1})(1 - DZ^{-1})}$$

where H(z) is in terms of "z" transform notation and A, B, C and D are constants which are positive real or zero.

12. A method for stopping forward rotation of a brushless DC motor of the type having a permanent rotor magnet radially disposed about the axis of rotation, said permanent magnet having like numbers of alternating, equally partitioned North and South poles, said motor having stator coils in fixed relation to the motor base, sequential energization of said coils imparting motion to said rotor magnet, the method for stopping rotor rotation comprising:
(a) applying drive current to said stator coils in a first sequence for driving said rotor in the reverse direction;
(b) detecting the occurrence of rotor direction reversal;
(c) applying drive current to said stator coils in a second sequence for driving said rotor in the forward direction;
(d) detecting the occurrence of rotor direction reversal;
(e) applying drive current to said stator coils in said first sequence;
(f) determining the time between the lastmost and the next rotor reversal;
(g) at said next rotor reversal applying drive current to said stator coils in said second sequence for a predetermined fraction of the time determined;
(h) iteratively repeating steps e, f, and g until no further rotor reversals are detected.

* * * * *